(12) United States Patent
Wise et al.

(10) Patent No.: US 8,700,247 B1
(45) Date of Patent: Apr. 15, 2014

(54) HYBRID ENGINE OPERATION SELECTION STRATEGY FOR MITIGATION OF DRIVELINE DISTURBANCE

(71) Applicant: GM Global Technology Operations LLC, Detroit, MI (US)

(72) Inventors: Jeremy Wise, Novi, MI (US); Chihang Lin, Ann Arbor, MI (US); Anthony H. Heap, Ann Arbor, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 13/705,938

(22) Filed: Dec. 5, 2012

(51) Int. Cl.
 *G06F 7/00* (2006.01)
(52) U.S. Cl.
 USPC .............. 701/22; 701/51; 701/54; 701/67; 701/87; 701/90; 123/350; 123/399; 123/406.23; 123/406.24; 123/436; 477/61; 477/78; 477/120; 477/148; 477/155; 180/65.23; 180/197; 180/247; 73/114.04; 73/114.15; 73/115.02
(58) Field of Classification Search
 USPC ............. 701/22, 51, 54, 67, 87, 90, 99, 101, 701/110, 111; 123/350, 399, 406.23, 123/406.24, 436, 481; 477/61, 78, 120, 477/148, 155, 156, 181; 180/65.23, 197, 180/247; 73/114.04, 114.15, 115.02; 903/946, 947; 60/711; 74/15.88
 See application file for complete search history.

(56) References Cited

U.S. PATENT DOCUMENTS

| | | | | |
|---|---|---|---|---|
| 5,070,983 | A * | 12/1991 | Leigh-Monstevens et al. | 192/85.63 |
| 6,845,338 | B1 * | 1/2005 | Willins et al. | 702/150 |
| 7,130,759 | B2 * | 10/2006 | Willins et al. | 702/150 |
| 8,165,777 | B2 * | 4/2012 | Heap | 701/102 |
| 2009/0118885 | A1 * | 5/2009 | Heap et al. | 701/22 |
| 2009/0118933 | A1 * | 5/2009 | Heap | 701/54 |

OTHER PUBLICATIONS

U.S. Appl. No. 13/624,045, Heap et al.

* cited by examiner

*Primary Examiner* — McDieunel Marc (57) ABSTRACT

A hybrid powertrain includes an engine, an electric machine, and a transmission. A method to control the powertrain includes monitoring operation of the powertrain, determining whether conditions necessary for growl to occur excluding motor torque and engine torque are present, and if the conditions are present controlling the powertrain based upon avoiding a powertrain operating region wherein the growl is enabled.

11 Claims, 6 Drawing Sheets

HYBRID ENGINE OPERATION SELECTION STRATEGY FOR MITIGATION OF DRIVELINE DISTURBANCE

TECHNICAL FIELD

This disclosure is related to noise, vibration and harshness issues in a hybrid drive powertrain.

BACKGROUND

The statements in this section merely provide background information related to the present disclosure. Accordingly, such statements are not intended to constitute an admission of prior art.

Powertrain systems may be configured to transmit torque originating from multiple torque-generative devices through a transmission device to an output member that may be coupled to a driveline. Such powertrain systems include hybrid powertrain systems and electric vehicle powertrain systems. Control systems for operating such powertrain systems can operate the torque-generative devices and apply torque transfer elements in the transmission to transfer torque in response to operator-commanded output torque requests, taking into account fuel economy, emissions, driveability, and other factors. Exemplary torque-generative devices include internal combustion engines and non-combustion torque machines. The non-combustion torque machines may include electric machines that are operative as motors or generators to generate a torque input to the transmission independently of a torque input from the internal combustion engine. The torque machines may transform vehicle kinetic energy, transferred through the vehicle driveline, to electrical energy that is storable in an electrical energy storage device. A control system monitors various inputs from the vehicle and the operator and provides operational control of the powertrain, including controlling transmission operating state and gear shifting, controlling the torque-generative devices, and regulating the electrical power interchange among the electrical energy storage device and the electric machines to manage outputs of the transmission, including torque and rotational speed.

SUMMARY

A hybrid powertrain includes an engine, an electric machine, and a transmission. A method to control the powertrain includes monitoring operation of the powertrain, determining whether conditions necessary for growl to occur excluding motor torque and engine torque are present, and if the conditions are present controlling the powertrain based upon avoiding a powertrain operating region wherein the growl is enabled.

BRIEF DESCRIPTION OF THE DRAWINGS

One or more embodiments will now be described, by way of example, with reference to the accompanying drawings, in which.

DETAILED DESCRIPTION

Figure 1:
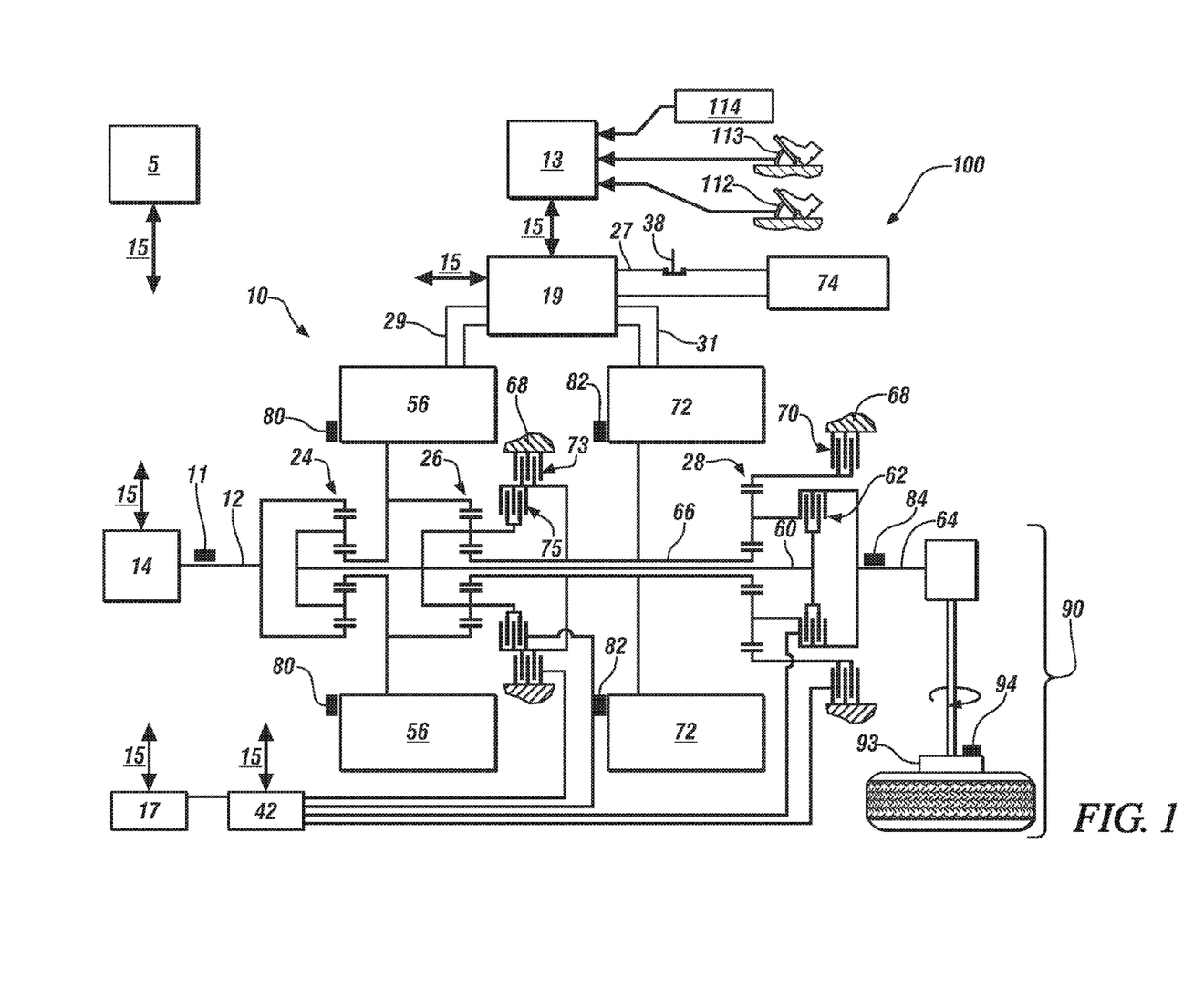
FIG. 1 illustrates a powertrain system including an internal combustion engine, a multi-mode electro-mechanical transmission, a driveline, and a controller, in accordance with the present disclosure.

Referring now to the drawings, wherein the showings are for the purpose of illustrating certain exemplary embodiments only and not for the purpose of limiting the same, FIG. 1 illustrates a powertrain system including an internal combustion engine, a multi-mode electro-mechanical transmission, a driveline, and a controller. FIG. 1 depicts a multi-mode powertrain system 100 that includes an internal combustion engine (engine) 14, a multi-mode transmission (transmission) 10, a driveline 90, and a controller 5. The transmission 10 mechanically couples to the engine 14 and includes first and second torque machines 56 and 72, which are electric motor/generators in one embodiment. The engine 14 and first and second torque machines 56 and 72 each generate torque that can be transferred via the transmission 10 to the driveline 90.

The exemplary engine 14 is a multi-cylinder internal combustion engine selectively operative in several states to transfer torque to the transmission 10 via an input member 12, and can be either a spark-ignition or a compression-ignition engine. The engine 14 includes a crankshaft operatively coupled to the input member 12 of the transmission 10. A rotational speed sensor 11 monitors rotational speed of the input member 12. Power output from the engine 14, i.e., rotational speed and engine torque, can differ from the input speed and the input torque to the transmission 10 due to placement of torque-consuming components on the input member 12 between the engine 14 and the transmission 10, e.g., a torque management device.

The illustrated transmission 10 is a two-mode, compound-split, electro-mechanical transmission that includes three planetary-gear sets 24, 26 and 28, and four engageable torque-transferring devices, i.e., clutches C1 70, C2 62, C3 73, and C4 75. Other multi-mode transmissions may instead be employed. As used herein, clutches refer to torque transfer devices that can be selectively applied in response to a control signal, and may be any suitable devices including by way of example single or compound plate clutches or packs, one-way clutches, band clutches, and brakes. A hydraulic circuit 42 is configured to control clutch states of each of the clutches, with pressurized hydraulic fluid supplied by an electrically-powered hydraulic pump 17 that is operatively controlled by the controller 5. Clutches C2 62 and C4 75 are hydraulically-applied rotating friction clutches. Clutches C1 70 and C3 73 are hydraulically-controlled brake devices that can be grounded to a transmission case 68. Each of the clutches C1 70, C2 62, C3 73, and C4 75 is hydraulically applied using pressurized hydraulic fluid supplied by the hydraulic control circuit 42 in this embodiment. The hydraulic circuit 42 is operatively controlled by the controller 5 to activate and deactivate the aforementioned clutches, provide hydraulic fluid for cooling and lubricating elements of the transmission, and provide hydraulic fluid for cooling the first and second torque machines 56 and 72. Hydraulic pressure in the hydraulic circuit 42 may be determined by measurement using pressure sensor(s), by estimation using on-board routines, or using other suitable methods.

The first and second torque machines 56 and 72 are three-phase AC motor/generator machines, each including a stator and a rotor, and respective resolvers 80 and 82. The motor stator for each machine is grounded to an outer portion of the transmission case 68, and includes a stator core with coiled electrical windings extending therefrom. The rotor for the first torque machine 56 is supported on a hub plate gear that is operatively attached to shaft 60 via the second planetary gear set 26. The rotor for the second torque machine 72 is fixedly attached to a sleeve shaft hub 66. Each of the resolvers 80 and 82 is signally and operatively connected to a transmission power inverter control module (TPIM) 19, and each senses and monitors rotational position of the resolver rotor relative to the resolver stator, thus monitoring rotational position of respective ones of first and second torque machines 56 and 72. Additionally, the signals output from the resolvers 80 and 82 may be used to determine rotational speeds for first and second torque machines 56 and 72.

The transmission 10 includes an output member 64, e.g. a shaft, which is rotatably connected to the driveline 90 to provide output power to the driveline 90 that is transferred to vehicle wheels 93, one of which is shown in FIG. 1. The output power at the output member 64 is characterized in terms of an output rotational speed and an output torque. A transmission output speed sensor 84 monitors rotational speed and rotational direction of the output member 64. Each of the vehicle wheels 93 is preferably equipped with a sensor 94 adapted to monitor wheel speed to determine vehicle speed, and absolute and relative wheel speeds for braking control, traction control, and vehicle acceleration management.

The input torque from the engine 14 and the motor torques from the first and second torque machines 56 and 72 are generated as a result of energy conversion from fuel or electrical potential stored in an electrical energy storage device (ESD) 74. The ESD 74 is high voltage DC-coupled to the TPIM 19 via DC transfer conductors 27. The transfer conductors 27 include a contactor switch 38. When the contactor switch 38 is closed, under normal operation, electric current can flow between the ESD 74 and the TPIM 19. When the contactor switch 38 is opened electric current flow between the ESD 74 and the TPIM 19 is interrupted. The TPIM 19 preferably includes a pair of power inverters and respective motor control modules configured to receive torque commands and control inverter states therefrom for providing motor drive or regeneration functionality to meet the motor torque commands. The power inverters include complementary three-phase power electronics devices, and each includes a plurality of insulated gate bipolar transistors for converting DC power from the ESD 74 to AC power for powering respective ones of the first and second torque machines 56 and 72, by switching at high frequencies. The insulated gate bipolar transistors form a switch mode power supply configured to receive control commands. Each phase of each of the three-phase electric machines includes a pair of insulated gate bipolar transistors. States of the insulated gate bipolar transistors are controlled to provide motor drive mechanical power generation or electric power regeneration functionality. The three-phase inverters receive or supply DC electric power via DC transfer conductors 27 and transform it to or from three-phase AC power, which is conducted to or from the first and second torque machines 56 and 72 for operation as motors or generators via transfer conductors 29 and 31 respectively.

The TPIM 19 transfers electrical power to and from the first and second torque machines 56 and 72 through the pair of power inverters and respective motor control modules in response to the motor torque commands. Electrical current is transmitted to and from the ESD 74 in accordance with whether the ESD 74 is being charged or discharged.

The controller 5 signally and operatively links to various actuators and sensors in the powertrain system 100 via a communications link 15 to monitor and control operation of the powertrain system 100, including synthesizing information and inputs, and executing routines to control actuators to meet control objectives related to fuel economy, emissions, performance, drivability, and protection of hardware, including batteries of ESD 74 and the first and second torque machines 56 and 72. The controller 5 is a subset of an overall vehicle control architecture, and provides coordinated system control of the powertrain system 100. The controller 5 may include a distributed control module system that includes individual control modules including a supervisory control module, an engine control module, a transmission control module, a battery pack control module, and the TPIM 19. A user interface 13 is preferably signally connected to a plurality of devices through which a vehicle operator directs and commands operation of the powertrain system 100. The devices preferably include an accelerator pedal 113, an operator brake pedal 112, a transmission range selector 114 (PRNDL), and a vehicle speed cruise control. The transmission range selector 114 may have a discrete number of operator-selectable positions, including the rotational direction of the output member 64 to enable one of a forward and a reverse direction. The user interface 13 may include a single device, as shown, or alternatively may include a plurality of user interface devices directly connected to individual control modules.

The aforementioned control modules communicate with other control modules, sensors, and actuators via the communications link 15, which effects structured communication between the various control modules. The specific communication protocol is application-specific. The communications link 15 and appropriate protocols provide for robust messaging and multi-control module interfacing between the aforementioned control modules and other control modules providing functionality including e.g., antilock braking, traction control, and vehicle stability. Multiple communications buses may be used to improve communications speed and provide some level of signal redundancy and integrity, including direct links and serial peripheral interface (SPI) buses. Communication between individual control modules may also be effected using a wireless link, e.g., a short range wireless radio communications bus. Individual devices may also be directly connected.

Control module, module, control, controller, control unit, processor and similar terms mean any one or various combinations of one or more of Application Specific Integrated Circuit(s) (ASIC), electronic circuit(s), central processing unit(s) (preferably microprocessor(s)) and associated memory and storage (read only, programmable read only, random access, hard drive, etc.) executing one or more software or firmware programs or routines, combinational logic circuit(s), input/output circuit(s) and devices, appropriate signal conditioning and buffer circuitry, and other components to provide the described functionality. Software, firmware, programs, instructions, routines, code, algorithms and similar terms mean any instruction sets including calibrations and look-up tables. The control module has a set of control routines executed to provide the desired functions. Routines are executed, such as by a central processing unit, and are operable to monitor inputs from sensing devices and other networked control modules, and execute control and diagnostic routines to control operation of actuators. Routines may be executed at regular intervals, for example each 3.125, 6.25, 12.5, 25 and 100 milliseconds during ongoing engine and vehicle operation. Alternatively, routines may be executed in response to occurrence of an event.

The powertrain system 100 is configured to operate in one of several states that can be described in terms of engine states including one of an engine-on state (ON) and an engine-off state (OFF), and transmission ranges including fixed gear, variable (EVT), and neutral modes, as set forth in Table 1.

TABLE 1

| Description | Engine State | Transmission Range | Applied Clutches |
|---|---|---|---|
| M1_Eng_Off | OFF | EVT Mode 1 | C1 70 |
| M1_Eng_On | ON | EVT Mode 1 | C1 70 |
| G1 | ON | Fixed Gear Ratio 1 | C1 70 C4 75 |
| G2 | ON | Fixed Gear Ratio 2 | C1 70 C2 62 |
| M2_Eng_Off | OFF | EVT Mode 2 | C2 62 |
| M2_Eng_On | ON | EVT Mode 2 | C2 62 |
| G3 | ON | Fixed Gear Ratio 3 | C2 62 C4 75 |
| G4 | ON | Fixed Gear Ratio 4 | C2 62 C3 73 |
| Neutral | ON/OFF | Neutral | — |

The transmission ranges described in Table 1 indicate the specific applied one(s) of clutches C1 70, C2 62, C3 73, and C4 75 for each of the ranges. For purposes of this description, when the engine state is OFF, the engine input speed is equal to 0 RPM, i.e., the engine crankshaft is not rotating. A fixed gear operation provides a fixed ratio operation of input-to-output speed of the transmission 10. In response to operator input via the accelerator pedal 113, the brake pedal 112, and the transmission range selector 114, as captured by the user interface 13, the control module 5 determines torque commands to control the torque actuators including the engine 14 and the first and second torque machines 56 and 72 to meet the output torque request at the output member 64 for transference to the driveline 90.

Each of the illustrated clutches includes a pair of shafts capable of transmitting reactive torque through the shaft. An engaged clutch can transmit a positive torque in a first direction or a negative torque in a second direction opposite to the first direction. A condition known as lash can occur when torque transmitted through the clutch changes from one of the directions to the other direction. Under some conditions, lash is imperceptible to occupants of the vehicle. Under other conditions, lash creates drivability issues, creating perceptible jerky acceleration of the vehicle or other driving performance degradation, or NVH issues. One particular type of NVH issue related to lash is known as growl. Under conditions causing one embodiment of growl, a perceptible rumble can be heard from the transmission. Growl can occur from a locked clutch experiencing lash. Lash and/or growl can also occur in gears, planetary gear set, and any metallic components meshed together that can experience play or have components crash together upon a reversal of torque. Methods disclosed herein are applied to an exemplary condition including a locked clutch. However, the examples provided are intended to be non-limiting examples, and similar sets of parameters enabling lash in other powertrain components can similarly be defined and controlled according to the methods disclosed herein to avoid lash and associated undesirable powertrain conditions such as growl.

Through modeling, testing, and/or calibration, conditions causing growl can be mapped and ranges of relevant values conducive to growl can be defined. In this way, growl can be reduced or eliminated by avoiding or minimizing operation in ranges conducive to growl.

Growl can occur in many operating scenarios. In some conditions, it may not be noticeable or audible. In other conditions, growl can be masked by high vehicle speeds and associated vehicle NVH conditions. In transmissions similar to the exemplary configuration of FIG. 1, an exemplary growl condition can be identified to likely occur when all of the following five conditions occur simultaneously: 1) the output speed of the transmission, shaft 64 of the exemplary transmission of FIG. 1, must exist between an identified minimum output shaft speed and an identified maximum output shaft speed; 2) the engine speed must exist between an identified minimum engine speed and an identified maximum engine speed; 3) clutches must be engaged in a clutch state conducive to growl; 4) engine torque must be above a minimum engine torque conducive to growl; and 5) motor torque must fall within a threshold motor torque range, for example, as embodied by the condition TmMinGrowl<Tm<TmMaxGrowl. According to one embodiment, this range is calibrated to −10 Newton meters (N*m)<Tm<10 N*m. In an exemplary transmission, as more of these conditions are present, growl will be more likely to occur. Other conditions can be identified for other transmissions that can cause growl, and critical ranges of values conducive to growl can similarly be identified for other transmissions. The conditions conducive to growl provided herein are exemplary, and the disclosure is not intended to be limited to the particular examples provided herein.

Of the five exemplary ranges, some of the controlling parameters can be controlled for desired operation of the vehicle. For example, for a desired speed of the vehicle, the transmission and use of the electric machines of FIG. 1 can be altered to control engine speed. In this way, engine speed can be controlled based upon desired operation of the vehicle and based upon avoiding the engine speed entering the range wherein growl is possible or more likely. Similarly engine torque and motor torques can be controlled or torque contributions of each of the torque generative devices can be controlled based upon avoiding ranges wherein growl is possible or more likely. Other parameters cannot be controlled based upon avoiding growl. The output speed is directly related to the speed of the vehicle. The output torque request is generated by the driver. Any scheme preventing the vehicle from going the desired speed of the operator is unlikely to be acceptable. A state of the clutches in the transmission may or may not be subject to change based upon avoiding growl.

Powertrain control methods permit a module controlling a hybrid powertrain to distribute torque generation requirements to the various component of the powertrain based upon an output torque request and control priorities for the powertrain. Settings of the transmission are similarly controlled based upon the desired operation of the powertrain. Operation of a test or model powertrain through various ranges of parameters can be mapped through experimentation, calibration, modeling or other means effective to evaluate powertrain performance, and distribution of the torque generation requirements and settings of the transmission of a later operating powertrain are controlled during operation based upon the mapped operation. According to one exemplary method of control, a control algorithm balances priorities of powertrain control based upon optimizing a control penalty function. Infringing upon different control priorities incurs penalties, and a control solution based upon a lowest penalty is selected to control the powertrain. Operation in regions conducive to growl can be assigned penalty values, and operation of the powertrain in these regions conducive to growl can be minimized or eliminated based upon the penalty assigned.

Figure 2:
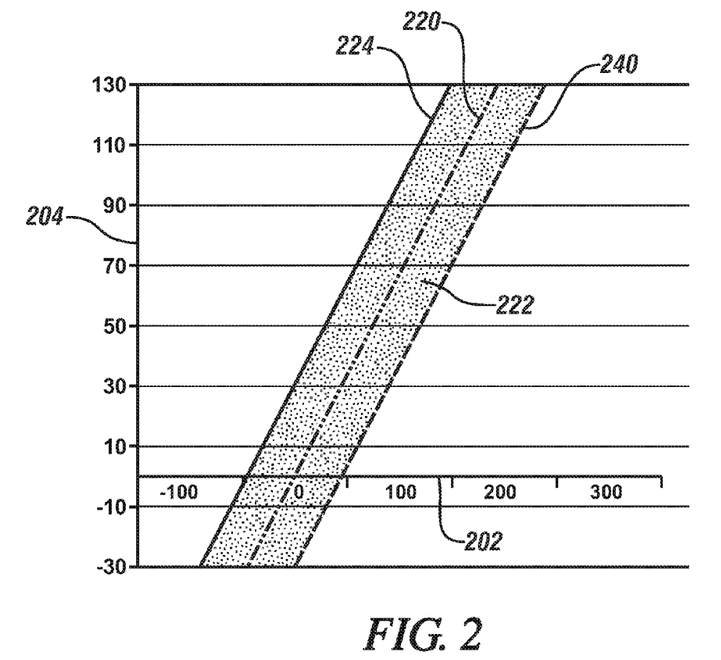
FIG. 2 illustrates data from an exemplary powertrain, illustrated upon an engine torque to output torque domain, illustrating regions wherein output torque growl is possible and not possible, in accordance with the present disclosure.

FIG. 2 illustrates data from an exemplary powertrain, illustrated upon an engine torque to output torque domain, illustrating regions wherein near zero output torque growl is possible and not possible. Horizontal axis 202 illustrates output torque, and vertical axis 204 illustrates engine torque. Line 220 illustrates a condition wherein a motor torque equals zero. Lines 222 and 240 define a region wherein motor torque and reactive torque through the clutch are within a threshold low region or an absolute value of the torque is lower than a threshold. The region 222 illustrates operation that should be avoided to stop the occurrence of growl. According to one embodiment a value of +/−15 Newton meters from line 220 is utilized to define region 222. According to one embodiment, growl can be avoided by preventing operation of the vehicle from entering the illustrated region 222.

Figure 3:
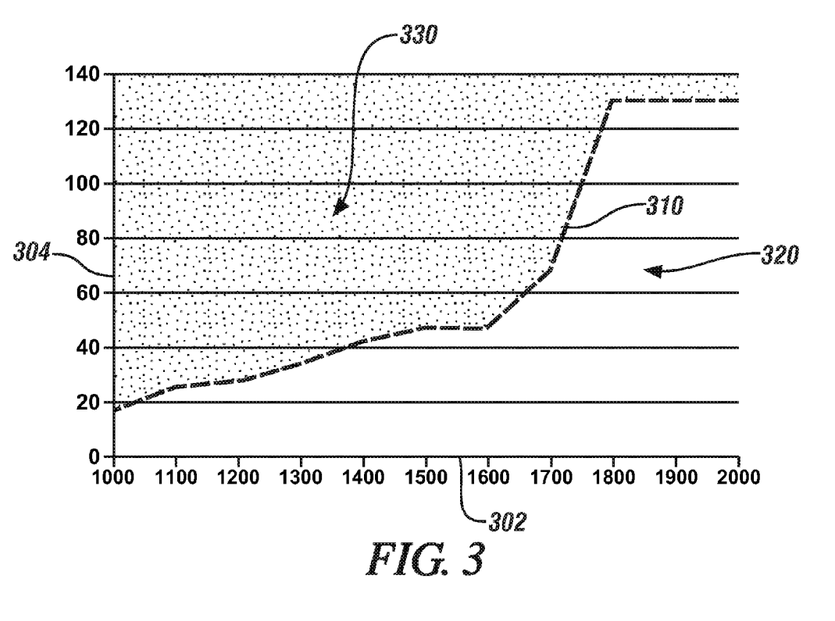
FIG. 3 illustrates data for an exemplary engine showing a permitted relationship between engine speed and engine torque, where 0-pk torque oscillations created from combustion at operating points are not great enough to cause growl no matter what the operating points are of the other torque generating machines, in accordance with the present disclosure.

FIG. 3 illustrates data for an exemplary engine showing a permitted relationship between engine speed and engine torque based upon a minimum drivability rating. Mapping of operation of a vehicle can, in one embodiment, be determined according to the effects of various parameters upon drivability of the vehicle. A correlation of engine speed and engine torque of an engine of a hybrid powertrain, wherein a motor of the powertrain has a low torque value, can be mapped, and a region or regions wherein engine speed and torque values create unacceptable NVH, can be identified. FIG. 3 illustrates engine speed on horizontal axis 302 and engine torque on vertical axis 304. Data plot 310 illustrates a gradation in NVH values for the tested powertrain, wherein NVH in region 320 is acceptable. Region 330 illustrates a region wherein the engine 0-pk torque oscillations due to combustion are great enough that an audible growl is observed if other components in the system are at operating points susceptible to growl. The intensity of the growl increases proportionally with engine torque and inversely with engine speed.

Figure 4:
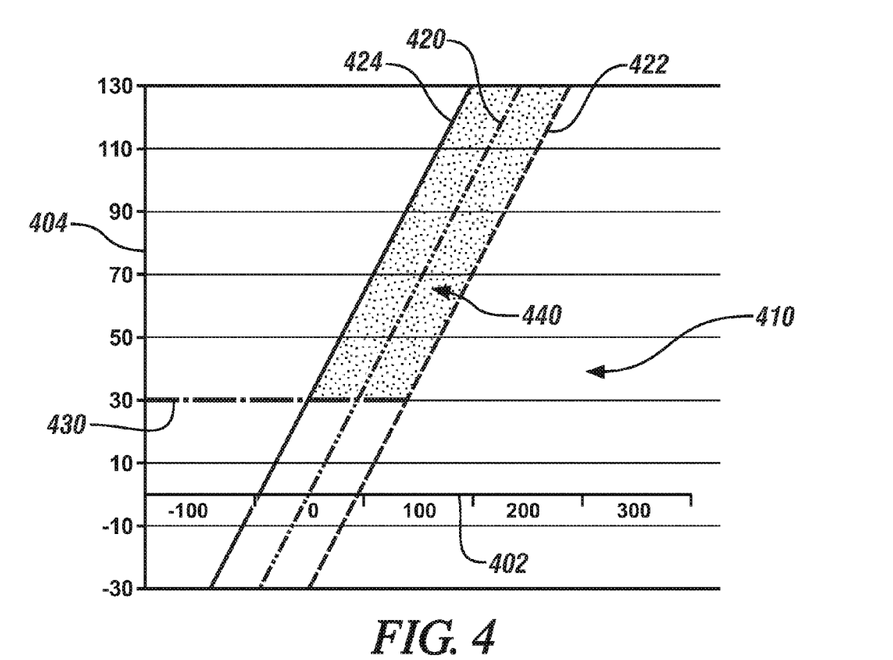
FIG. 4 illustrates data from an exemplary powertrain, illustrated upon an engine torque to output torque domain, illustrating regions wherein near zero output torque growl is possible and not possible, including a maximum engine torque value, below which growl is not possible, in accordance with the present disclosure.

FIG. 4 illustrates data from an exemplary powertrain, illustrated upon an engine torque to output torque domain, illustrating regions wherein near zero output torque growl is possible and not possible, including an engine speed dependent maximum engine torque value, below which growl is not possible. Horizontal axis 402 illustrates output torque, and vertical axis 404 illustrates engine torque. Line 420 illustrates a condition wherein a motor torque equals zero. Lines 422 and 424 define a region wherein motor torque and reactive torque through the clutch are within a threshold low region or an absolute value of the torque is lower than a threshold. This region 440 defined by 422 and 424 is selected based upon growl being possible when the motor torque is below a threshold value, and region 440 illustrates operation that should be avoided to stop the occurrence of growl. Line 430 illustrates a minimum engine torque at which growl can occur. Line 430 is influenced by operating parameters such as engine speed, wherein a higher engine speed can move line 430 to a higher value on the vertical axis. Because both engine torque and motor torque must be within regions conducive to growl in order for growl to be possible, no restriction based upon motor torque is required when the operation of the engine is below the threshold engine torque defined by line 430. Region 410 illustrates a half plane wherein operation cannot result in growl. Operation in a half plane control strategy includes keeping one of the motors pre-loaded with a positive torque or restricting the relevant torque operation of the motor to one half of its full range. An enhanced half-plane includes the addition of the operating region allowed by or illustrated under the max engine torque line 430.

Figure 5:
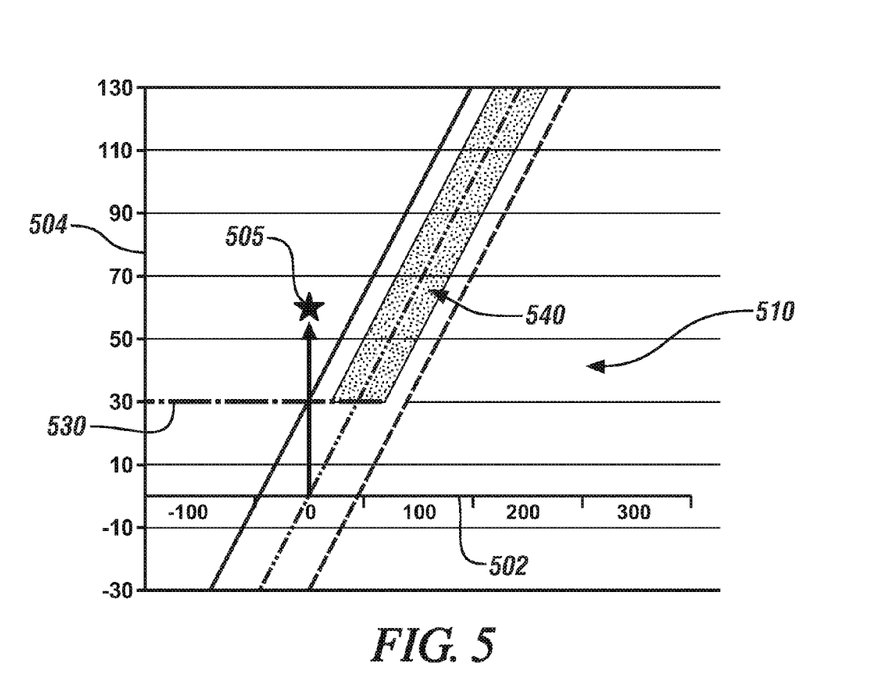
FIG. 5 illustrates data from an exemplary powertrain, illustrated upon an engine torque to output torque domain, illustrating a defined permissible region of operation wherein near zero output torque growl is and not possible, and operation at an exemplary operating point wherein an engine is operating solely to service an accessory/charge load, in accordance with the present disclosure.

FIG. 5 illustrates data from an exemplary powertrain, illustrated upon an engine torque to output torque domain, illustrating a defined permissible region of operation wherein near zero output torque growl is and not possible, and operation at an exemplary operating point wherein an engine is operating solely to service an accessory/charge load outside of the permissible region. Horizontal axis 502 illustrates output torque, and vertical axis 504 illustrates engine torque. Region 540 illustrates a region of operation conducive to growl similar to region 440 of FIG. 4. Region 510 is illustrated wherein operation of the powertrain is enabled without being conducive to growl. Operating point 505 is illustrated at zero output torque and at some positive engine torque corresponding to an accessory/charge load. An accessory charge load includes torque required of the engine to power devices such as a motor/generator to charge the batteries of the vehicle, a power steering pump, an air conditioning compressor, etc. Point 505 is outside of region 540, but directly transitioning to region 510 can cause operation to enter region 540 and potentially cause growl to occur.

Figure 6:
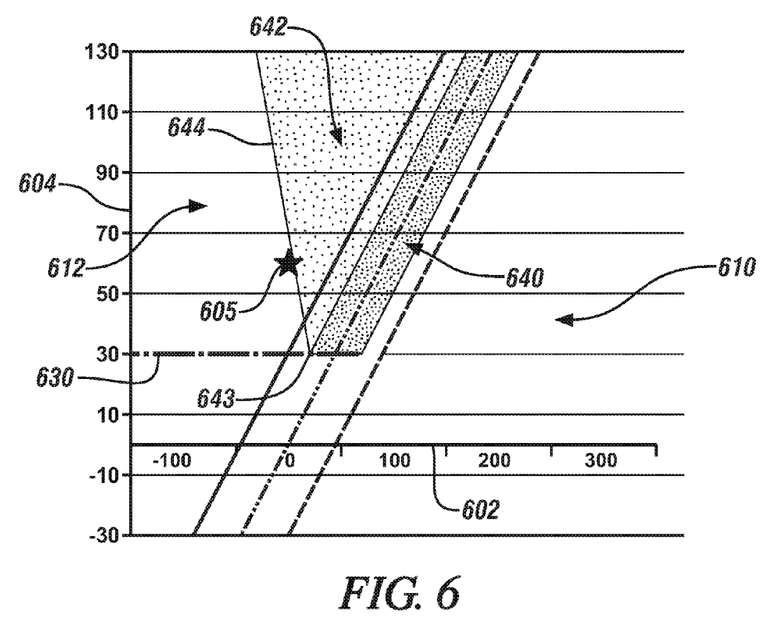
FIG. 6 illustrates the operating point of FIG. 5 including the permissible region of operation of FIG. 5 with an expanded region of non-permitted operation corresponding to the operating point, in accordance with the present disclosure.

FIG. 6 illustrates the operating point of FIG. 5 including the permissible region of operation of FIG. 5 with an expanded region of permitted operation corresponding to the operating point. Horizontal axis 602 illustrates output torque, and vertical axis 604 illustrates engine torque. Region 640 illustrates a region of operation conducive to growl similar to region 540 of FIG. 5. Region 610 is illustrated wherein operation of the powertrain is enabled without being conducive to growl. Operating point 605 is illustrated at zero output torque and at some positive engine torque corresponding to an accessory/charge load. Point 605 is outside of region 640. In order to permit a transition from point 605 to region 610, a region 612 including point 605 and avoiding region 640 can be defined. Further, to avoid entry into region 640 and promote orderly transition from point 605 to region 610, impermissible region 642 can be defined. In the exemplary region 642 of FIG. 6, a boundary between permissible region 612 and impermissible 642 can be defined by creating boundary 644 based upon point 605 and corner 643 of region 640. By permitting operation in regions 612 and 610, a transition can be controlled avoiding regions conducive to growl.

Figure 7:
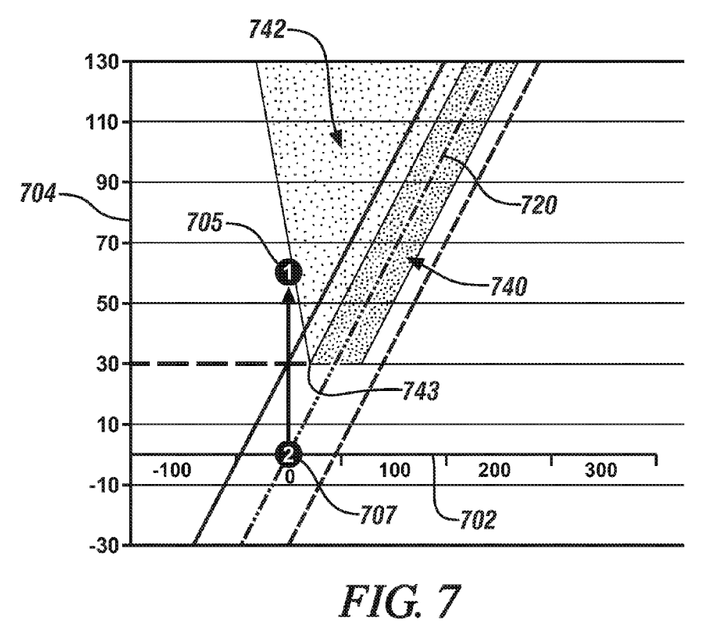
FIG. 7 illustrates engine on, accessory charging operation including the operating point of FIG. 5, engine off operation, and transitions therebetween, in accordance with the present disclosure.

FIG. 7 illustrates engine on, accessory charging operation including the operating point of FIG. 5, engine off operation, and transitions therebetween. Horizontal axis 702 illustrates output torque, and vertical axis 704 illustrates engine torque. Regions 740 and 742 illustrate regions impermissible due to growl. Region 740 and the associated corner 743 are defined based upon a zero motor torque line 720 which intersects point 707 whereat engine torque and output torque equal zero. The slope of line 720 ensures that corner 743 is to the right of an output torque equals zero value. Due to corner 743 being to the right of point 705, a transition between point 705 and point 707 whereat the engine is in an off state can be shown to remain outside of impermissible regions 740 and 742. Where a transition from a point corresponding to an accessory/charge load to an engine off point can be shown to be outside of impermissible regions of operation, a control transition can be utilized wherein any transition to or from an accessory/charge state can be operated through an engine off state to avoid growl.

Figure 8:
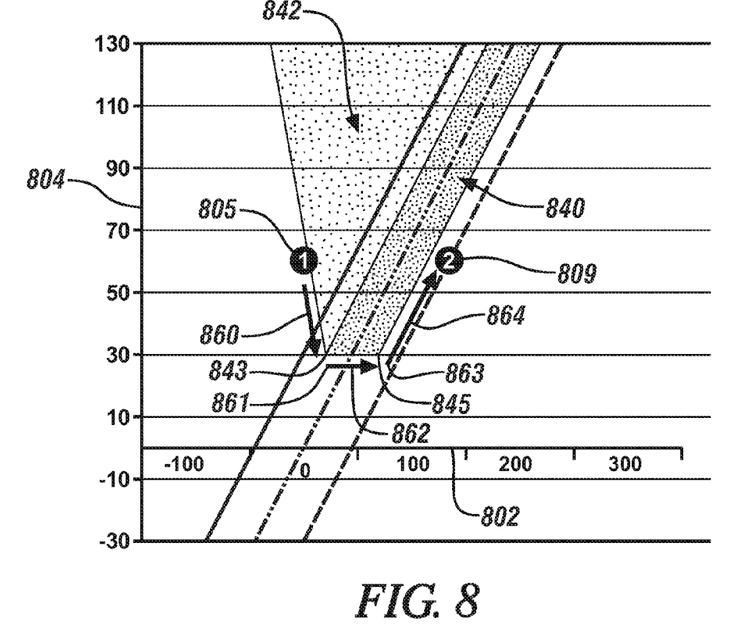
FIG. 8 illustrates engine on, accessory charging operation including the operating point of FIG. 5, and a transition to a second operating point whereat the engine transmits torque corresponding to an output torque, in accordance with the present disclosure.

FIG. 8 illustrates engine on, accessory charging operation including the operating point of FIG. 5, and a transition to a second operating point whereat the engine transmits torque corresponding to an output torque. Horizontal axis 802 illustrates output torque, and vertical axis 804 illustrates engine torque. By configuring a transition based upon known boundaries of impermissible regions of operation, the transition can be controlled from one point in a permissible region to a second point in another permissible region. Wherein regions 840 and 842 are defined, corners 843 and 845 can be identified illustrating transitions that can be controlled to avoid regions 840 and 842. A first portion 860 of a transition can be defined by defining a line segment from a first point 805 to a transition point 861 to the left and below point 843. A second portion 862 of the transition can be defined by defining a line segment from point 861 to a transition point 863 to the right and below point 845. A final portion 864 of the transition can be defined by defining a line segment from 863 to a destination operating point 809. The transition of FIG. 8 is exemplary, and a number of transitions including curved segments, a single transition point, or three or more transition points to define further portions of the transition are envisioned, and the disclosure is not intended to be limited to the particular examples provided.

Figure 9:
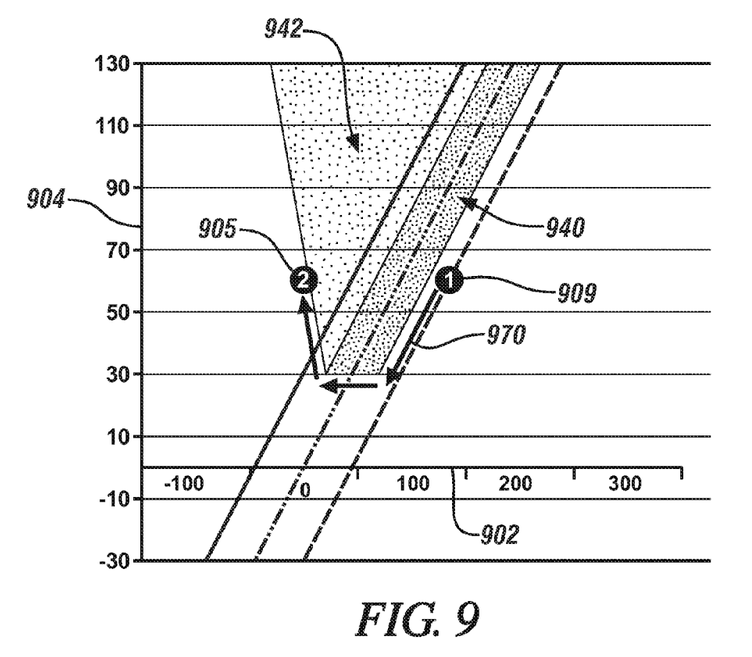
FIG. 9 illustrates the transition of FIG. 8 in reverse, in accordance with the present disclosure.

FIG. 9 illustrates the transition of FIG. 8 in reverse. Horizontal axis 902 illustrates output torque, and vertical axis 904 illustrates engine torque. Impermissible regions 940 and 942 are illustrated. Based upon an initial point of 909 and a destination point 905, the method disclosed in relation to FIG. 8 can be performed in reverse to define a three portion transition 970.

Figure 10:
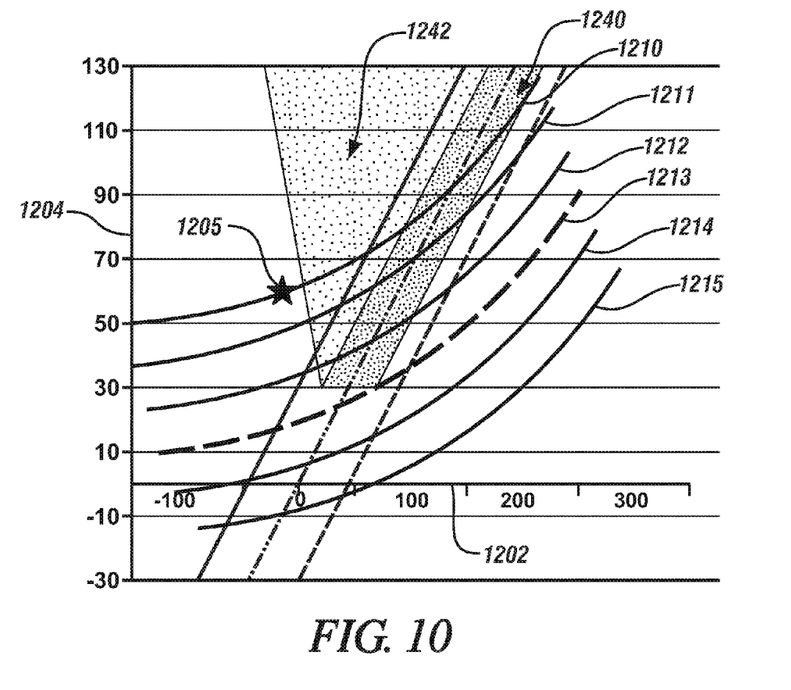
FIG. 10 illustrates lines of constant battery power as they relate to operating points in an engine torque/output torque domain, in accordance with the present disclosure.

FIG. 10 illustrates lines of constant battery power as they relate to operating points in an engine torque/output torque domain. Horizontal axis 1202 illustrates output torque, and vertical axis 1204 illustrates engine torque. Zone 1240 illustrates a region of operation wherein growl is enabled. Zone 1242 illustrates a region of operation wherein operation is prevented. Lines of battery power 1210, 1211, 1212, 1213, 1214, and 1215 are illustrated, showing increasing capacity of the battery and the associated motor to enable operation. The system operation is restricted above the respective lines. Line 1210 represents a battery condition whereat the powertrain cannot operate to transition from point 1205 around region 1240. Line 1215 illustrates a battery condition whereat the powertrain can easily operate to transition from point 1205 around region 1240. Line 1213 of battery power that intersects the lower right corner of the growl region represents the minimum battery required to operate at that point. When considering the evaluated operating point (represented by the star), an exemplary method determines if the required battery power will be available to complete the transition (taking into account battery power limits and accessory power). According to one method, if the transition is not enabled by the available batter power, the speed of the engine can be increased to increase a minimum engine torque at which growl can occur, thereby moving a lower boundary of region 1240 higher on the vertical axis.

Figure 11:
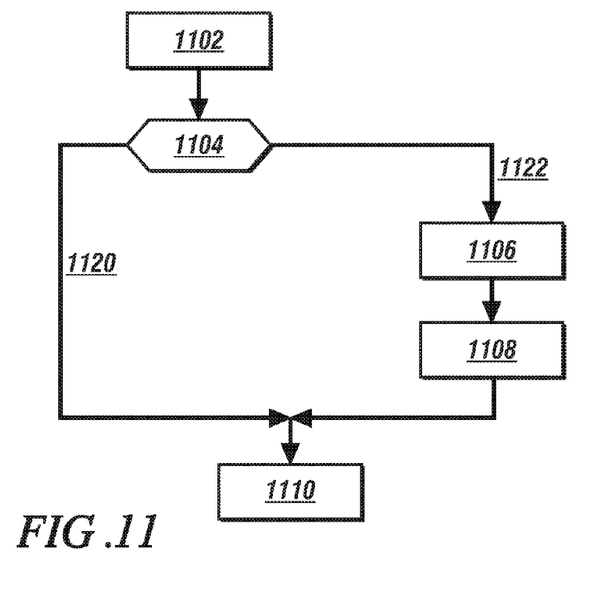
FIG. 11 illustrates an exemplary process, in accordance with the present disclosure.

FIG. 11 illustrates an exemplary process 200 in accordance with the disclosure. Table 2 is provided as a key to FIG. 11 wherein the numerically labeled blocks and the corresponding functions are set forth as follows.

TABLE 2

| BLOCK | BLOCK CONTENTS |
|-------|----------------|
| 1102  | Start |
| 1104  | Are Conditions to Enable Growl Excluding Motor Torque and Engine Torque Present? |
| 1106  | Define a Region of Impermissible Powertrain Operation wherein Growl Is Possible |
| 1108  | Control the Powertrain Based Upon Avoiding the Region |
| 1110  | End |

Process 1100 starts at step 1102. At step 1104, a determination is made whether conditions necessary to enable growl excluding motor torque being a particular low range and engine torque being within a particular range are present. If the conditions are present, process 1100 follows transition 1122 to step 1106. If conditions are not present, process 1100 follows transition 1120 to step 1110. At step 1106, an impermissible region is defined wherein powertrain operation can enable growl. The regions can be loaded from a stored data or computed in real time based upon operating parameters. According to one embodiment, battery power available to the powertrain can be evaluated at this step in the process to determine available transitions to avoid the region of impermissible operation. At step 1108, the powertrain is controlled based upon avoiding the defined region. At step 1110, process 1100 ends.

Growl can occur at a number of different locations in a powertrain. Each of the locations can exhibit different regions conducive to growl. The methods disclosed herein can be used to simultaneously avoid growl in each of the different locations. In one example, penalties in a control algorithm can be assigned to operation in any of the regions conducive to growl, such that control of the powertrain is restrained from entering any of the regions wherein growl would be enabled.

Transitions are disclosed herein to move from one powertrain operating point to another while avoiding a powertrain operating region wherein growl is enabled. Sometimes fast transitions in the operation of the engine can facilitate a smooth transition or aid in avoiding the regions wherein growl is enabled. Under some conditions, engine air or spark torque and engine speed can be used to quickly control the engine.

The disclosure has described certain preferred embodiments and modifications thereto. Further modifications and alterations may occur to others upon reading and understanding the specification. Therefore, it is intended that the disclosure not be limited to the particular embodiment(s) disclosed as the best mode contemplated for carrying out this disclosure, but that the disclosure will include all embodiments falling within the scope of the appended claims.

The invention claimed is:

1. Method to control a hybrid powertrain comprising an engine, an electric machine, and a transmission, the method comprising:
monitoring operation of the powertrain;
determining, by a processor, whether conditions necessary for growl to occur excluding motor torque and engine torque are present; and
if the conditions are present, controlling the powertrain based upon avoiding a powertrain operating region wherein the growl is enabled.

2. The method of claim 1, wherein controlling the powertrain comprises controlling the powertrain to operate only outside of the powertrain operating region wherein the growl is enabled.

3. The method of claim 1, wherein controlling the powertrain comprises:
assigning a control penalty to operation that would be inside the powertrain operating region wherein the growl is enabled; and
controlling the powertrain based upon the control penalty.

4. The method of claim 1, wherein controlling the powertrain comprises:
operating the engine to solely serve an accessory/charge load; and
identifying a powertrain transition to transition the engine from the operation serving the accessory/charge load to an engine off state, wherein the powertrain transition remains outside of the powertrain operating region wherein the growl is enabled.

5. The method of claim 1, wherein controlling the powertrain comprises:
monitoring an initial operating point of the powertrain;
monitoring a destination operating point for the powertrain;
determining a transition point to transition the powertrain from the initial operating point to the destination operating point while remaining outside of the powertrain operating region wherein the growl is enabled; and
controlling a powertrain transition from the initial operating point to the destination operating point based upon the transition point.

6. The method of claim 5, wherein controlling the powertrain further comprises:
determining a plurality of transition points; and
controlling the powertrain transition based upon the transition points.

7. The method of claim 5, further comprising monitoring an available battery power; and
controlling the powertrain transition from the initial operating point to the destination operating point based upon the available battery power.

8. The method of claim 1, wherein the conditions necessary for growl to occur comprises the motor torque being less than a threshold motor torque; and
wherein the powertrain operating region wherein the growl is enabled is determined based upon the threshold motor torque.

9. The method of claim 8, wherein the conditions necessary for growl to occur further comprises the engine torque being greater than a threshold engine torque; and
wherein the powertrain operating region wherein the growl is enabled is determined further based upon the threshold engine torque.

10. The method of claim 1, wherein the conditions necessary for growl to occur comprise:
an output speed of the transmission between an identified minimum output shaft speed and an identified maximum output shaft speed;
clutches within the transmission engaged in a clutch state conducive to growl; and
motor torque within a threshold low motor torque range.

11. Method to control a hybrid powertrain comprising an engine, an electric machine, and a transmission, the method comprising:
monitoring operation of the powertrain;
determining, by a processor, whether conditions making growl more likely to occur excluding motor torque and engine torque are present; and
if said conditions are present, controlling the powertrain based upon avoiding a powertrain operating region wherein the growl is made more likely.

* * * * *